From United States Patent [19]

Cummins

[11] 4,316,534
[45] Feb. 23, 1982

[54] PAN INDEXING APPARATUS
[75] Inventor: Donald L. Cummins, Hopewell, Va.
[73] Assignee: AMF Incorporated, White Plains, N.Y.
[21] Appl. No.: 162,548
[22] Filed: Jun. 24, 1980
[51] Int. Cl.³ .............................................. B65G 37/00
[52] U.S. Cl. .................................... 198/345; 198/491; 198/633; 141/180; 53/249
[58] Field of Search ............... 198/424, 491, 345, 633, 198/634; 141/168, 180, 283; 53/249, 250

[56] References Cited
U.S. PATENT DOCUMENTS 2,703,668  3/1955  Baechle ........................... 141/180 X
3,343,689  9/1967  Fehely ............................. 198/633 X
3,811,548  5/1974  Neff ................................. 198/345
4,019,621  4/1977  Hanson ........................... 198/491 X Primary Examiner—Robert B. Reeves
Assistant Examiner—Paul A. Sobel
Attorney, Agent, or Firm—David E. Dougherty; Charles J. Worth

[57] ABSTRACT

A pan indexer for use with a moulder/panner with a gate and a conveyor, having a carrier for a cantilevered template with a spaced series of tangs for successively engaging and releasing pans on the conveyor when the template is moved up and down in synchronism with dough pieces being deposited through a gate from the moulder/panner to pans on the conveyor.

9 Claims, 6 Drawing Figures

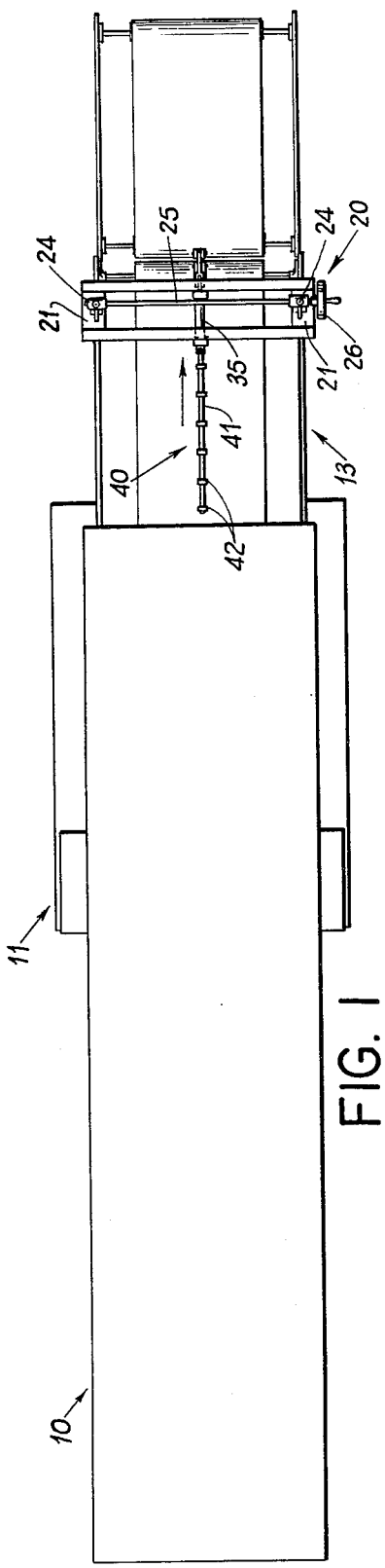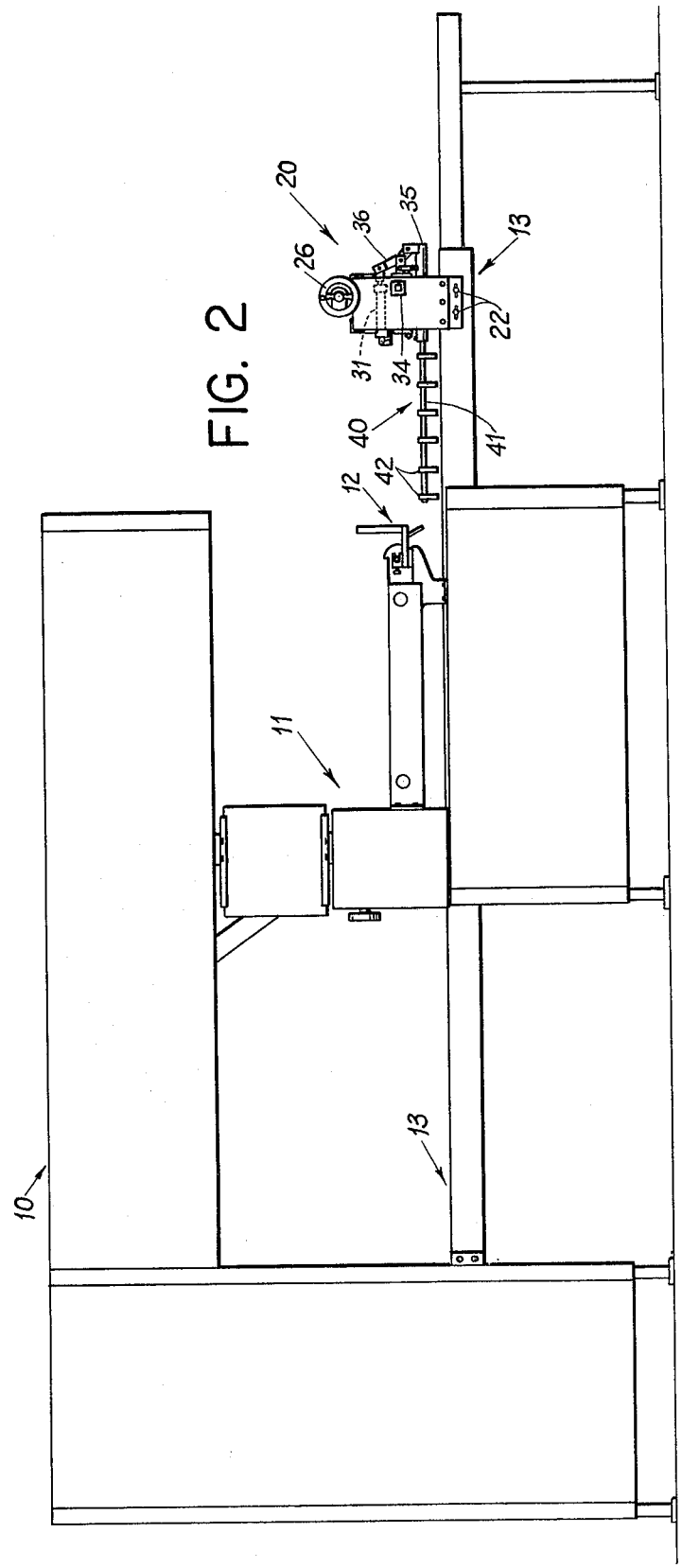

PAN INDEXING APPARATUS

This invention relates generally to panning molded dough pieces, and more particularly, to controlling the flow of pans past the molder/panner of dough make-up equipment.

Over the years there has been a progressive speed-up of dough make-up apparatus. Because of the facility to vary or adjust this equipment, it is commonly used for making various products. In addition to handling dough pieces for breads, rolls and buns, bakeries have been using this equipment for making specialty items. Automatic controls have been introduced and automatic pan feeders are provided.

The molder/panner normally feeds laterally spaced groups of formed dough pieces to baking pans. Each pan receives a plurality of groups of dough pieces, each such group necessarily being appropriately spaced from the next succeeding group. The baking pans normally have a peripheral flange and may or may not have cups to receive the dough pieces. The present indexing apparatus is arranged to cooperate with the flange of such pans. However, the novel apparatus is equally capable of indexing cupped pans which have no peripheral flange.

Accordingly, an object of the present invention is to provide a pan indexer which operates rapidly and permits uniform pan movement.

Another object of the present invention is to provide pan indexing apparatus capable of rapid adjustment for changes of product or pans.

And, another object of the present invention is to provide a pan indexer capable of accurately holding the first of a line of pans on a moving conveyor.

And still, another object of the present invention is to provide a pan indexer with pan engaging means which moves in the direction of pan movement when releasing a pan being indexed.

The foregoing and other objects and advantages will appear more fully hereinafter from a consideration of the detailed description which follows, taken together with the accompanying drawings wherein a single embodiment of the invention is illustrated by way of example. It is to be expressly understood, however, that the drawings are for illustration purposes only and are not to be construed as defining the limits of the invention.

FIGS. 1 and 2 are plan and side elevational 25 views, respectively, diagrammatically illustrating a proofer, moulder/panner with a pan conveyor and pan indexing apparatus in accordance with the present invention.

Figure 4:
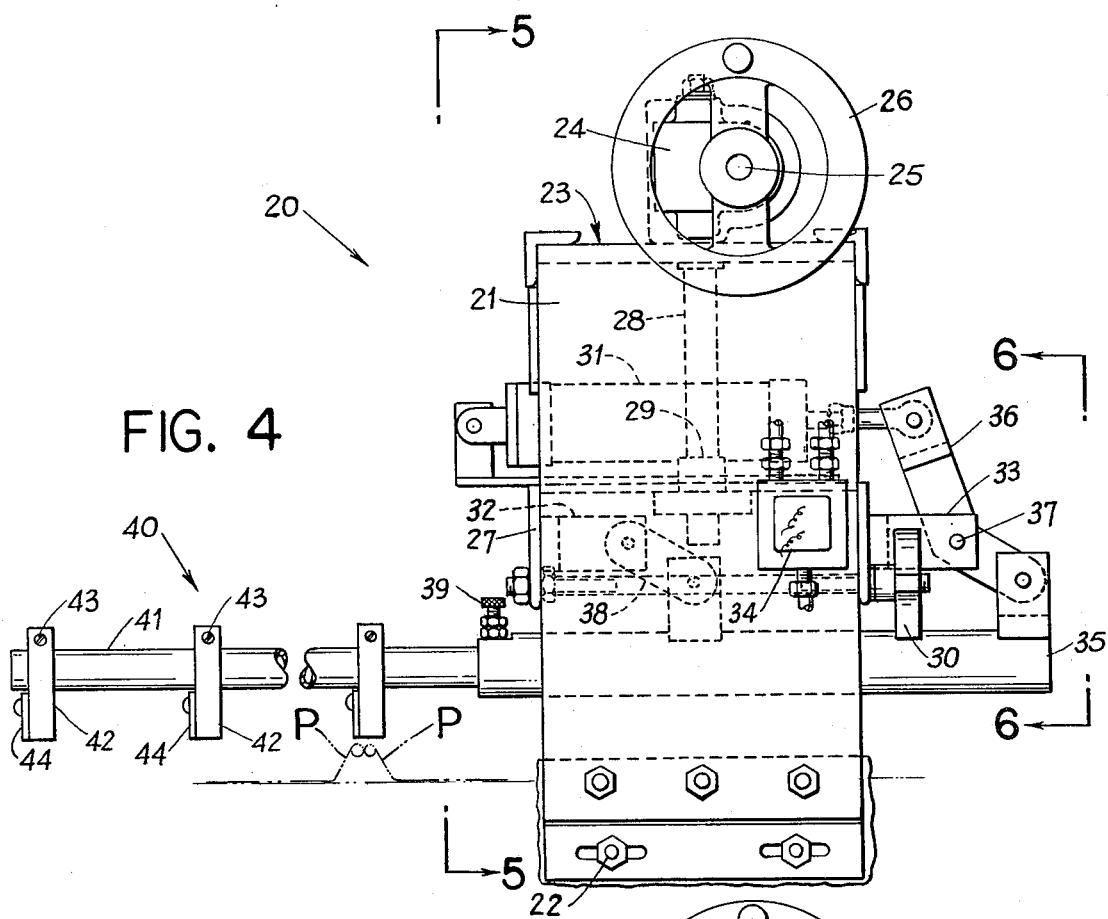
FIGS. 3 and 4 are enlarged side elevational views of the pan indexing apparatus of FIGS. 1 and 2; the apparatus being in the pan holding mode in FIG. 3 and the pan release mode in FIG. 4.

The general arrangement of associated dough make-up apparatus is shown in FIGS. 1 and 2 wherein a proofer 10 is provided to receive laterally spaced groups of dough pieces from scaling and rounding (not shown), for example, as disclosed in U.S. Pat. No. 2,858,775 which was granted Nov. 4, 1958 to F. D. Marraso. After an appropriate predetermined rest period in the proofer 10, such groups of dough pieces are presented to the moulder/panner 11 where they are shaped and delivered to baking pans (not shown) on a pan conveyor 13 for delivery to a wet or final proofer prior to bake-off. The moulder/panner 11 is provided with gate means 12 through which the formed dough pieces pass.

The gate means 12 is provided with a suitable conventional pulsing means, either electrical or pneumatic, (not shown) for momentarily energizing the novel indexing apparatus 20 which operates in synchronization with the moulder/panner to release the leading pan on the conveyor 13 to move in discrete steps or predetermined distances to appropriately space longitudinally successive groups of dough pieces and to prevent them from being deposited one upon the other.

Figure 3:
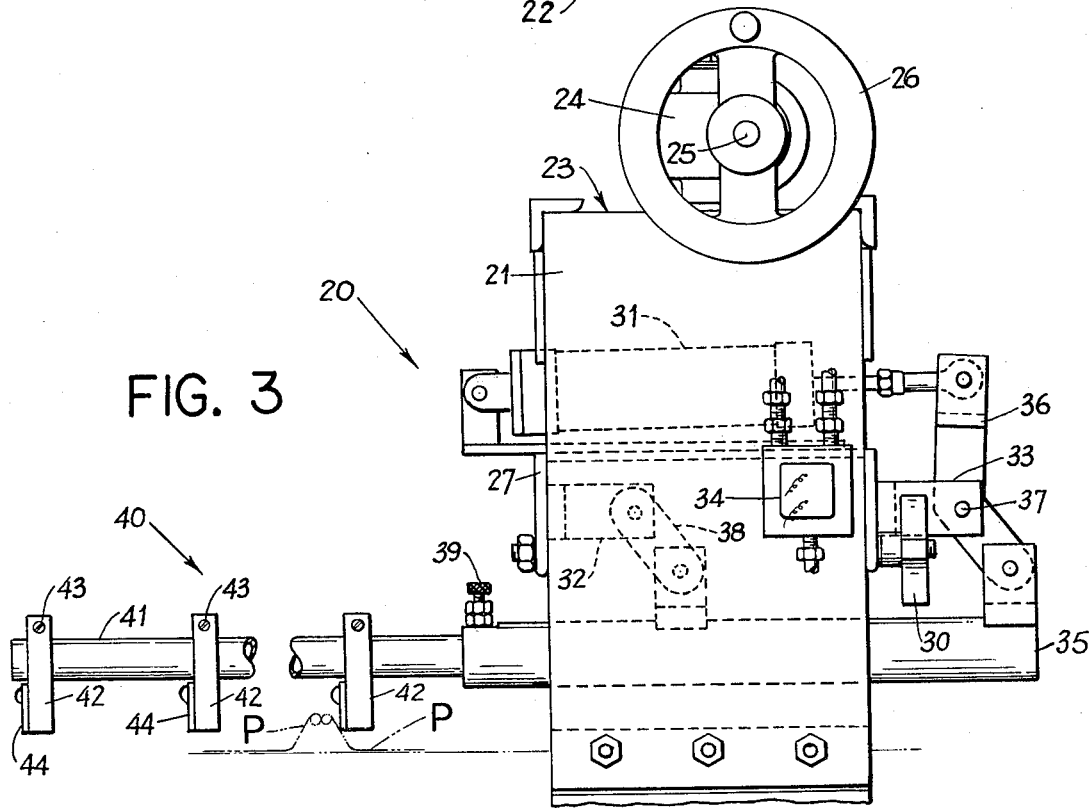
Figure 5:
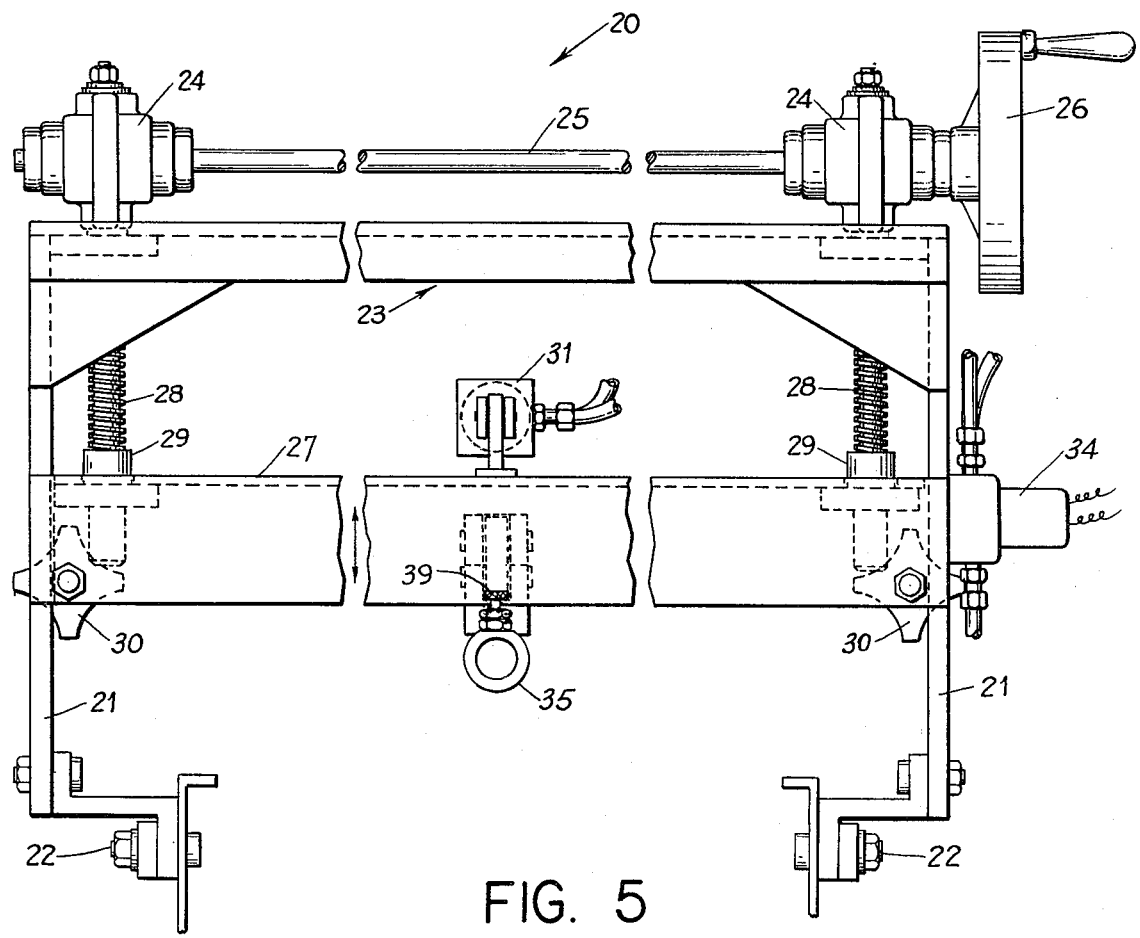
FIG. 5 is a front elevational view of the pan indexing apparatus with the template removed taken on line 5—5 of FIG. 4.
Figure 6:
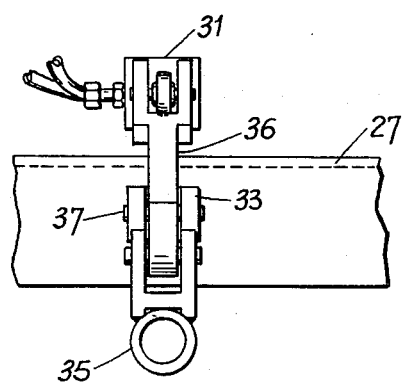
FIG. 6 is a fragmentary rear elevational view taken on line 6—6 of FIG. 4.

The novel indexing apparatus 20, best shown in FIGS. 3 to 5, is provided with a frame means comprising a pair of laterally spaced vertical leg or track members 21 releasably connected at their lower ends to the side frame members of the pan conveyor 13 by suitable fastening means 22. The lower ends of the members 21 or the side frame members of conveyor 13 are suitably slotted to permit limited movement longitudinally along the conveyor to position the indexing means, as required, relative to the gate means 12. The upper ends of the legs 21 are connected together and support a fixed horizontal frame or platform means 23 which mounts at its ends a pair of right angle drives 24 operably connected together by a rotatable shaft 25 having a hand wheel 26 at one end.

A vertically movable member or elevator platform 27 is arranged at its ends to engage and move on the vertical legs or tracks 21. Each of the right angle drives 24 is provided with a screw or threaded shaft 28 which extends downwardly and threadedly engages a flange nut 29 mounted on the elevator platform 21 in vertical alignment with the right angle drive from which the screw depends. Thus, by rotating the hand wheel 21, the shaft 25 is rotated and through drives 24 causes the screws 28 to turn which cooperate with nuts 29 to move the elevator platform 27 up or down, depending upon the direction of rotation of the hand wheel 26 to provide vertical adjustment means for pan height. To prevent the horizontal member 27 from creeping during operation of the indexing apparatus 20, it is provided with a pair of manually operable clamp type creep locks 30.

A pneumatic axial motor or piston and cylinder 31 is mounted on the platform 27 centered between the tracks 21 and longitudinally disposed above the center axis of the conveyor 13. As shown, the cylinder of the motor 31 is pivotally connected to the front of platform 27 with the piston extending rearwardly therefrom or in the direction of conveyor movement. A rearwardly extending bracket 32 is connected to the front of the member 27 directly below motor 31 and is longitudinally aligned with a corresponding bracket 33 connected to the rear of member 27. A conventional solenoid valve 34 is mounted on one of the tracks 21 for controlling the flow of pressure fluid such as compressed air for extending and retracting the motor 31 as required, the operation of which will be further discussed.

A horizontally disposed tubular carrier 35 which extends longitudinally along the central axis of the conveyor 13 is connected at its rear end by the lower arm of a bell crank 36 to the bracket 33. The bell crank 36 connected to bracket 33 by a pivot 37 has its upper arm connected to the piston of motor 31. The tubular carrier 35 is also connected to the bracket 32 by links 38 which are equal in length and parallel to the lower leg of the bell crank 36.

Thus, as the motor 31 retracts and extends causing the bell crank 36 to rotate on its pivot 37, the tubular carrier 35 will move on the links 38 and the lower arm of the bell crank in an arcuate path up and away from, and down and toward the conveyor 13 but will always maintain its horizontal disposition, as will be further discussed.

The indexing apparatus 20 is provided with a cantilevered template 40 comprising a rod 41 with a plurality of equally spaced tangs 42 mounted on and depending from the rod. The rod 41 has a supported end inserted into the front of the tubular carrier 35 which is releasably locked thereto by a detent means 39, and extends from the supported end toward the moulder/panner 11. The number and spacing of the tangs 42 depends upon the size of the pans being used and the number of groups of formed dough pieces being deposited in each pan.

The tangs 42 may be made of a suitable plastic material or of metal, preferably, with appropriate plastic face pads 44, as shown. While the tangs 42 may be fixedly connected to the rod 41, it is preferable that they may be movable on the rod and capable of being locked in desired positions to permit use of a single template 40 with various pans and different products. For this, the upper ends of the tangs 42 may be split to form C-clamps means which are locked in position by threaded members 43 in a conventional manner.

The novel indexing means 20 has an additional versatility for use in an environment where the pans and/or product changes several times within a limited time span. In such a situation it would not be acceptable to continuously change the number and/or spacing of the tangs 42. To facilitate such changes one would have a plurality of templates 40 each with a particular number of tangs 42 which are appropriately spaced for use with a particular pan or product. To change templates for a change of product or pans, the detent 39 is released, and the existing template 40 is removed from the carrier 35 which is replaced by the appropriate template required by the change.

In operation, the indexing mechanism 20 has a three step set-up. First, an appropriate template 40 is inserted into the tubular carrier 35 and locked therein by the detent 39. The frame means is moved longitudinally along the frame of conveyor 13 as required to appropriately position the template 40 relative to the gate means 12, and is locked in position by fasteners 22. Finally, by use of the hand wheel 26, the horizontal support or platform member 27 is moved vertically to provide the tangs 42 with a proper elevation for engaging and releasing pans P, as required, and then member 27 is locked in position by the creep locks 30.

Pans are loaded on to the conveyor 13, power is turned on and all of the apparatus is operative. The first tang 42 engages the rear flange of the first pan positioning the front of the second pan beneath the gate 12, and pressure fluid is connected to extend motor 31 (see FIG. 3).

As formed dough pieces pass through gate 12 and drop on to the pan, the pulsing means associated with the gate sends a pulse signal to the solenoid valve 34 which momentarily provides pressure to retract motor 31 elevating the template 40 so that the first tang 42 releases the pans for movement by the conveyor 13 (see FIG. 4). Since this is only a momentary condition, solenoid 34 reconnects pressure to extend motor 31 which lowers the template 40 so the next succeeding tank 42 engages the pan flange (see FIG. 3). This operation continues with each tang 42 successively engaging and momentarily releasing the flange of a pan and then successive pans in order.

Because of the geometry of the support means (links 38 and lower leg of the bell crank 36) the attitude of the carrier 35 and template 40 does not change as they move up and down. In other words, the carrier 35 and template 40 are always horizontal or parallel to the plane of the conveyor 13.

It should be noted that the carrier 35 and template 40 move up and down along an arcuate path having a longitudinal component. Thus, as they move upwardly, the tangs 42 are moved away from the pan flange in the direction of pan movement. Downward movement moves the tangs 42 toward the approaching pan flange to arrest pan movement, and the force of impact between the tang 42 and the pan flange assists in properly positioning dough pieces on the pan.

While the single embodiment of the invention has been illustrated and described in detail, it is to be expressly understood that the invention is not limited thereto. Various changes may be made in the design and arrangement of the parts without departing from the spirit and scope of the invention as the same will be understood by those skilled in the art.

What is claimed is:

1. Indexing apparatus for baking pans on an endless belt type conveyor, comprising
   frame means adapted to be mounted on the frame of the conveyor;
   carrier means movably mounted on said frame means;
   a cantilevered template connected at one end to said carrier means and extending therefrom longitudinally along the conveyor;
   said template being disposed parallel to and spaced above the conveyor, and having an equally spaced series of tangs extending downwardly toward the conveyor sequentially engaging pans thereon; and
   means for momentarily moving said carrier means and template upwardly from the conveyor thereby disengaging one of said tangs from a pan and engaging the pan by the next successive tang permitting the pan to move in successive discrete steps.

2. Indexing apparatus in accordance with claim 1, and said template having a rod-like member connected at one end to said carrier means and being parallel to the conveyor during upward and downward movement of said templates; and
   said tangs being connected at their upper ends to said rod-like member.

3. Indexing apparatus in accordance with claim 2, and quick release means releasably connecting said template to said carrier means thereby facilitating changing templates when pans or product such pans receive are changed.

4. Indexing apparatus in accordance with claim 2, and said tangs being releasably connected to and movable along said rod-like member when released for changing the spacing between said tangs.

5. Indexing apparatus in accordance with claim 4, and quick release means releasably connecting said template to said carrier means thereby facilitating changing templates when pans or product such pans receive are changed.

6. Indexing apparatus in accordance with claim 5, and said means for momentarily moving said carrier means and template comprising
- an axial pressure fluid motor connected at one end to said frame means and at its other end to said carrier; and
- means for providing pressure fluid to one side of said motor and in response to a signal momentarily providing pressure fluid to the other side of said motor to momentarily move said template away from the conveyor.

7. Indexing apparatus in accordance with claim 6, and said template being movable upwardly along an arcuate path having a component of movement in the direction of movement of the pans.

8. Indexing apparatus in accordance with claim 7, and
- said frame means having a space pair of vertical members and a horizontal platform member engaging said vertical members at its ends;
- said carrier means and motor mounted on said platform member of said frame means; and
- means for moving said platform member vertically to adjust the space between said template and the conveyor.

9. Indexing apparatus in accordance with claim 8, and means for adjusting the position of said indexing apparatus longitudinally relative to the conveyor.

* * * * *